Jan. 20, 1953   F. P. HESS   2,625,846
METHOD OF DRILLING CUTTING PLATES
Filed Feb. 13, 1951   2 SHEETS—SHEET 1

Inventor:-
Frederick P. Hess
by his Attorneys
Howson & Howson

Jan. 20, 1953 F. P. HESS 2,625,846
METHOD OF DRILLING CUTTING PLATES
Filed Feb. 13, 1951 2 SHEETS—SHEET 2

Inventor:
Frederick P. Hess
by his Attorneys
Howson & Howson

Patented Jan. 20, 1953

2,625,846

UNITED STATES PATENT OFFICE 2,625,846

METHOD OF DRILLING CUTTING PLATES

Frederick P. Hess, Philadelphia, Pa., assignor to The Enterprise Manufacturing Co. of Pennsylvania, Philadelphia, Pa., a corporation of Pennsylvania Application February 13, 1951, Serial No. 210,729

4 Claims. (Cl. 77—64)

This invention relates to new and useful improvements in methods for drilling the large number of small openings or holes in the cutter plates of food choppers and the like.

In food choppers of the conventional well-known types there is provided an apertured cutting plate against one face of which moves a knife that operates to cut the food as it is forced through the openings of the cutting plate by the customary feed screw or scroll. The cutting plates of such choppers either have the holes therein arranged in the form of a continuous spiral outwardly from the center of the plate or the holes are arranged in a series of parallel straight lines extending across the plate.

Up to the present time the plate with its openings arranged in a spiral has been the least expensive to manufacture. This is so because it is possible to drill the holes in the plate automatically in a single drill press having mechanism for advancing the plate step-by-step as each succeeding hole is drilled. On the other hand, however, cutting plates having the spiral opening arrangement are not preferred because the spacing required between the openings in the same and adjacent convolutions is comparatively large and increases outwardly of the plate so that the number of openings that can be provided in the spiral opening plate is substantially less than in plates having the parallel straight rows of openings.

On the other hand, the straight row arrangement of openings in a cutting plate permits the openings to be staggered and therefore more closely spaced with respect to openings in adjacent rows so that a considerably greater number of openings can be provided in a cutting plate having its openings arranged in straight rows than in a similar plate having openings of the same size arranged in a spiral as described. The straight row opening type of plate with its greater number of openings is universally preferred because it produces a finer and better cutting action, also faster.

Offsetting this, however, is the very much greater cost of manufacture of the straight row opening type of cutting plate because prior to the present invention it has been necessary manually to lay-out on the plate the location of each opening or hole to be drilled and then each hole must be drilled individually and separately from every other hole. It will be apparent that this method of drilling the openings in the straight row style of plate makes their cost of manufacture so high that these plates can be used only in the high priced grades of food choppers.

With the foregoing in mind, the principal object of the present invention is to provide a novel method for drilling cutting plates having straight rows of openings which is very much less expensive than the manufacture of such plates heretofore.

Another object of the invention is to provide a novel method for drilling cutting plates having straight rows of openings as set forth which compares favorably with the cost of drilling cutting plates of the type having its openings arranged in a spiral.

These and other objects of the invention are hereinafter fully set forth and described with reference to the accompanying drawings, in which.

Figure 4:
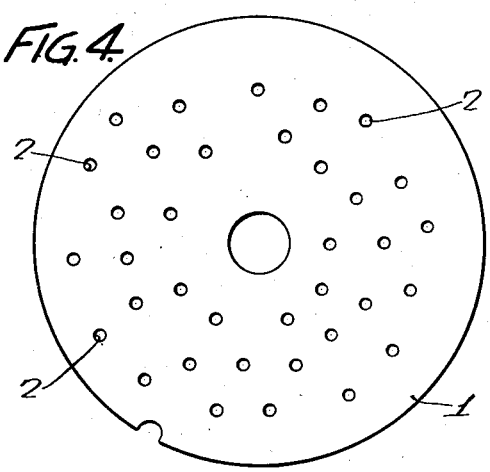

Fig. 4 is a plan view of a cutting plate disk showing the location of the openings or holes drilled in the plate by the first drilling operation and the relative arrangement and location of the corresponding number of drills mounted in the drill press; and Figs. 5 to 9, inclusive, respectively, are plan views of the cutting plate disk showing the openings or holes formed therein by operation of the drills during the dwell between each successive one-sixth increment of rotation of the cutting plate disk.

Figure 1:
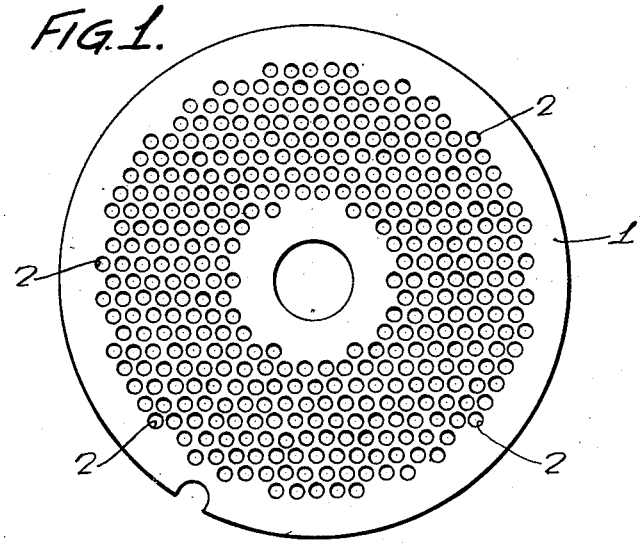
Fig. 1 is a plan view of a cutting plate having parallel rows of openings drilled in accordance with the method of the present invention.
Figure 2:
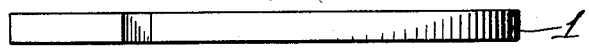
Fig. 2 is a side elevational view of the cutting plate.

Referring now more particularly to the drawings, Figs. 1 and 2 show a conventional type food chopper cutting plate 1 having therein a large number of openings or holes 2 arranged in a plurality of parallel straight rows extending crosswise of the plate.

In accordance with the present invention the holes 2 in the plate 1 are formed by a number of drill spindles 3 which is but a small fraction of the total number of holes 2 provided in the finished cutting plate. The spindles 3 are arranged so that by rotation of the plate step-by-step through successive increments each of one-sixth revolution of the plate, the spindles operate to drill correspondingly positioned holes in the plate. The plate then is reversely positioned or presented to the spindles and the drilling operations repeated through another succession of one-sixth revolutions of the plate.

Figure 3:
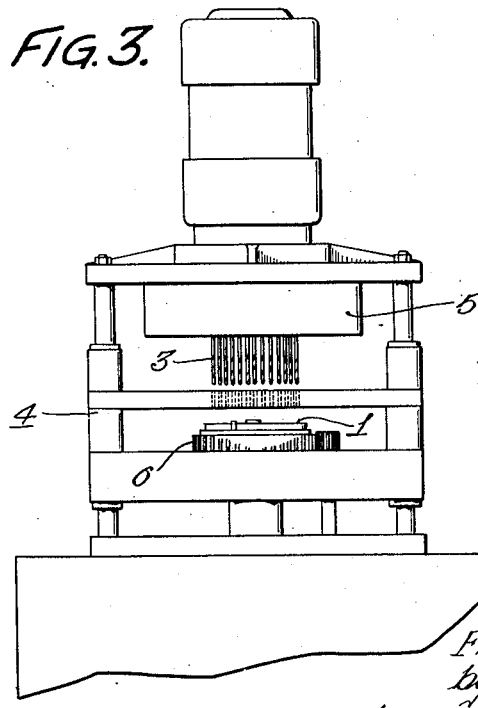
Fig. 3 is an elevational view of a drill press having a plurality of drill spindles mounted therein according to the present invention.

The drilling operations may be carried out on a suitable drill press 4, for example, as shown in Fig. 3 of the drawing. The press may have a vertically reciprocable drill head 5 in which the spindles 3 are mounted above a worktable or support 6 for the plate 1. The table 6 is rotatable and power driven by mechanism operable automatically to rotate the table 6 in a step-by-step manner through successive uniform increments each equal to one-sixth of a revolution thereof. Between each step-by-step movement of the table 6 there is a dwell or pause which causes the support 6 and plate 1 thereon to remain stationary for a time of sufficient duration to enable the drill head 5 to be actuated downwardly and cause the spindles 3 to drill a corresponding number of holes in the plate 1.

The drill spindles 3 are mounted in the head 5 of the press 4 in a predetermined arrangement or pattern in which the several spindles 3 are disposed in relatively spaced relation with respect to one another both radially and circumferentially of the plate 1 to be drilled, for example, in the pattern or arrangement represented by the location of the drill holes 2 in the plate 1 shown in Fig. 4 of the drawings. Fig. 4 shows the cutting plate 1 after the first drilling operation and the drill holes 2 therein correspond in number and location to the drill spindles 3 in the head 5 of the press 4.

According to the present method, the blank plate to be drilled is fixedly mounted on the press table 6 in a predetermined start position with respect to the circumference of the plate and in axial alignment with the drill head 5. The drill head 5 then is actuated downwardly to cause the spindles 3 to drill a corresponding number of holes 2 in the plate conforming to the pattern or arrangement shown in Fig. 4 of the drawings. After this initial drilling operation has been completed and the head 5 and drill spindles 3 have been withdrawn the plate 1 is rotated one-sixth of a revolution and then stops.

Figure 5:
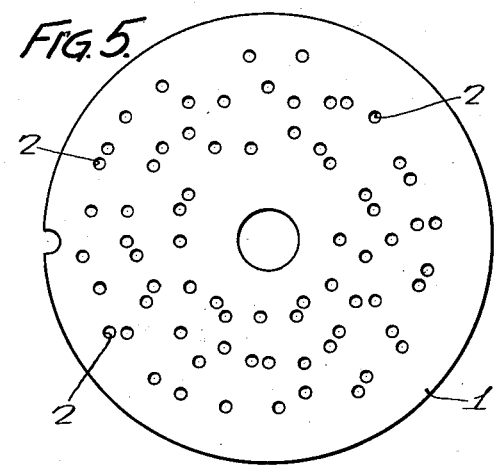
Figure 6:
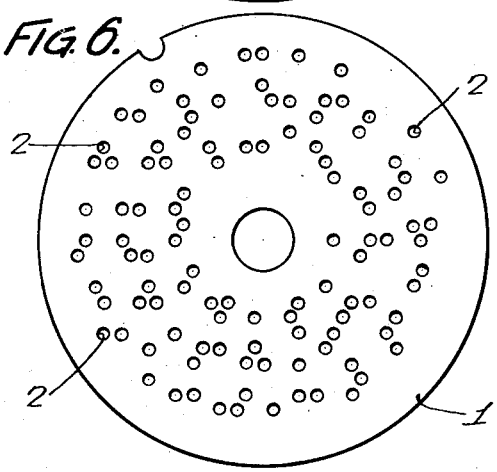
Figure 7:
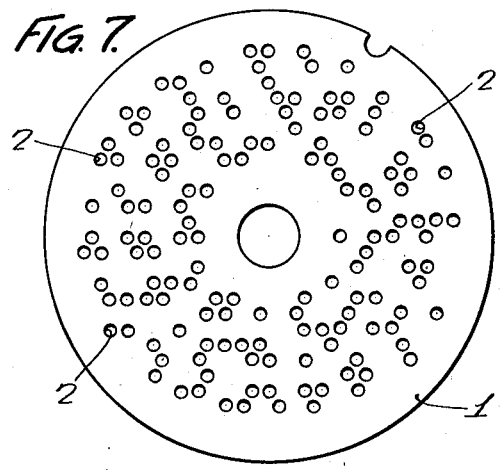
Figure 8:
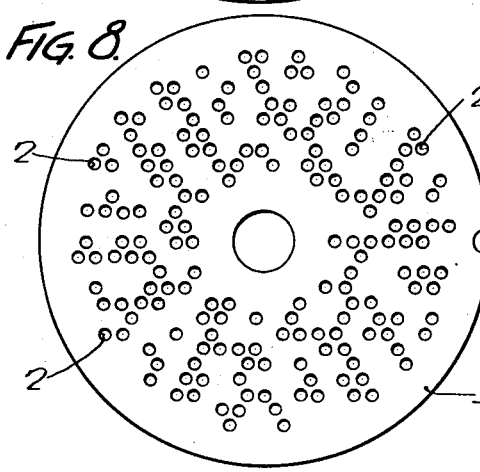
Figure 9:
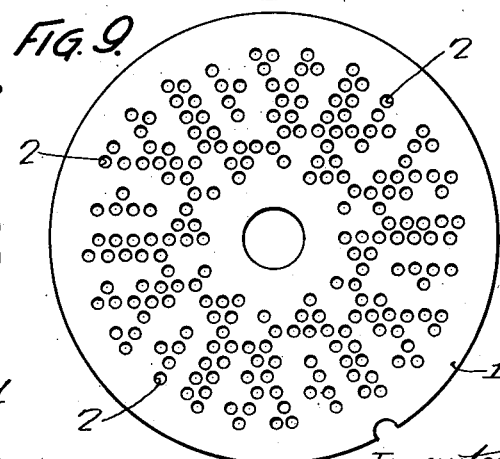

During this stop period the drill head is again actuated downwardly to cause the spindles 3 to drill a second group of holes 2 in the plate so that the pattern of the holes therein now is as shown in Fig. 5 of the drawings. The plate is subsequently actuated step-by-step to the successive dwell or stop positions shown in Figs. 6, 7, 8 and 9 of the drawings and during each of these stop periods the drill head 5 is actuated downwardly to cause the spindles 3 to drill a corresponding additional number of holes 2 in the plate to produce the patterns or arrangements shown in said Figs. 6, 7, 8 and 9, respectively.

After the sixth drilling operation has been completed as described, the plate 1 is reversely positioned on the press table 6; that is, turned upside down and fixedly secured thereon in the same position circumferentially as it was initially. The head 5 is then actuated downwardly to cause the spindles 3 to drill correspondingly positioned holes in the plate. When this has been done the table 6 with plate 1 thereon is rotated step-by-step, in the same manner previously described, through a second series of uniform increments each of one-sixth revolution, and during the intervening stop periods the head 5 is actuated downwardly to cause the spindles 3 to drill additional corresponding numbers of holes 2 in the plate 1, the final drilling operation completing the holes 2 in the plate so that it appears as shown in Fig. 1 of the drawings. Since the second series of drilling operations with the plate reversed is similar to the first series of drilling operations, except for the fact that additional holes are drilled in the plate after each step-by-step movement of the plate, it is not deemed necessary to show the plate 1 and its holes for each of the second series of drilling operations.

The advantages and economics of the method of the present invention for drilling cutting plates having parallel straight rows of openings as compared with the prior practice of manually laying-out and individually drilling each hole in the plate will be obvious to those working in the art. The cutting plate 1 shown in Fig. 1 of the drawings has a total of 370 holes therein which are produced by the present method in twelve drilling operations utilizing 36 spindles as compared with 370 drilling operations required prior to the present invention. In this connection it will be noted that the number of spindles 3 employed in the present disclosure is greater than one-twelfth of the total number of holes in the finished plate 1, and it is pointed out that during certain of the twelve drilling operations comprised in the present method a small number of the drill spindles will pass through drill holes which have already been formed in the plate by a preceding drilling operation, this being necessary in order to complete in twelve operations the total number and arrangement of holes in the finished plate 1 shown in Fig. 1 of the drawings.

While a particular embodiment of the present invention has been illustrated and described herein, it is not intended to limit the invention to this disclosure and changes and modifications may be made within the scope of the following claims.

I claim:

1. The method of drilling a large number of small openings in the cutter plates of food choppers utilizing a substantially less number of spindles than the total number of openings to be drilled in said plate, which comprises rotating a plate step-by-step from a predetermined start position through six successive increments each equal to one-sixth revolution of the plate, during the dwell between each step-by-step movement of the plate actuating a plurality of drill spindles as a group into operative engagement with the plate to drill correspondingly positioned openings therein, said plurality of drill spindles being predeterminedly and non-uniformly positioned relative to one another and constituting in number a small fractional part of the total number of openings to be drilled thereby in said plate, reversely positioning the partially drilled plate with respect to the drill spindles, rotating said reversely positioned plate step-by-step from the same start position through a second series of six successive increments each equal to one-sixth revolution of the plate, and during the dwell between each second series of step-by-step movements of the plate actuating the plurality of drill spindles as a group into operative engagement with the reversely positioned plate to drill correspondingly positioned openings therein.

2. The method of drilling a large number of small openings in the cutter plates of food choppers utilizing a substantially less number of spindles than the total number of openings to be drilled in said plate, which comprises positioning a plate to be drilled in alignment with a drill head having a plurality of drill spindles therein predeterminedly and non-uniformly arranged relative to one another both circumferentially and radially with respect to the plate so that each spindle is operable to drill a correspondingly positioned opening in the plate, said plurality of drill spindles being predetermined and non-uniformly positioned relative to one another and constituting in number a small fractional part of the total number of openings to be drilled thereby in said plate, rotating said plate step-by-step from a predetermined start position through six successive increments each equal to one-sixth revolution of the plate, during the dwell between each step-by-step movement of the plate actuating said plurality of drill spindles as a group into operative engagement with the plate to drill correspondingly positioned openings therein, reversely positioning the partially drilled plate with respect to the drill spindles in the same position rotationally as the initial start position, rotating said reversely positioned plate step-by-step from said start position through a second series of six succesive increments each equal to one-sixth revolution of the plate, and during the dwell between each second series of step-by-step movements of the plate actuating the plurality of drill spindles as a group into operative engagement with the reversely positioned plate to drill correspondingly positioned openings therein.

3. The method of drilling a large number of small openings in the cutter plates of food choppers utilizing a substantially less number of spindles than the total number of openings to be drilled in said plate, rotating a plate step-by-step from a predetermined start position through a predetermined number of equal increments, during the dwell between each step-by-step movement of the plate actuating a plurality of drill spindles as a group into operative engagement with the plate to drill correspondingly positioned openings therein, said plurality of drill spindles being predeterminedly and non-uniformly positioned relative to one another and constituting in number a small fractional part of the total number of openings to be drilled thereby in said plate, reversely positioning the partially drilled plate with respect to the drill spindles in the same position rotationally as the initial start position, rotating said reversely positioned plate step-by-step from said start position through a second series of the same number of equal increments, and during the dwell between each second series of step-by-step movements of the plate actuating the plurality of drill spindles as a group into operative engagement therewith to drill correspondingly positioned openings therein.

4. The method of drilling a large number of small openings in the cutter plates of food choppers utilizing a substantially less number of spindles than the total number of openings to be drilled in said plate, which comprises positioning a plate to be drilled in alignment with a drill head having a plurality of drill spindles therein predeterminedly and non-uniformly arranged relative to one another both circumferentially and radially with respect to the plate so that each spindle is operable to drill a correspondingly positioned opening in the plate, said plurality of drill spindles being predeterminedly and non-uniformly positioned relative to one another and constituting in number a small fractional part of the total number of openings to be drilled thereby in said plate, rotating said plate step-by-step from a predetermined start position through a predetermined number of equal increments, during the dwell between each step-by-step movement of the plate actuating said plurality of drill spindles as a group into operative engagement with the plate to drill correspondingly positioned openings therein, reversely positioning the partially drilled plate with respect to the drill spindles in the same position rotationally as the initial start position, rotating said reversely positioned plate step-by-step from said start position through a second series of the same number of equal increments, and during the dwell between each second series of step-by-step movements of the plate actuating the plurality of drill spindles as a group into operative engagement therewith to drill correspondingly positioned openings therein.

FREDERICK P. HESS.

REFERENCES CITED

The following references are of record in the file of this patent:

UNITED STATES PATENTS

| Number | Name | Date |
| --- | --- | --- |
| 257,061 | Parry | Apr. 25, 1882 |